UNITED STATES PATENT OFFICE.

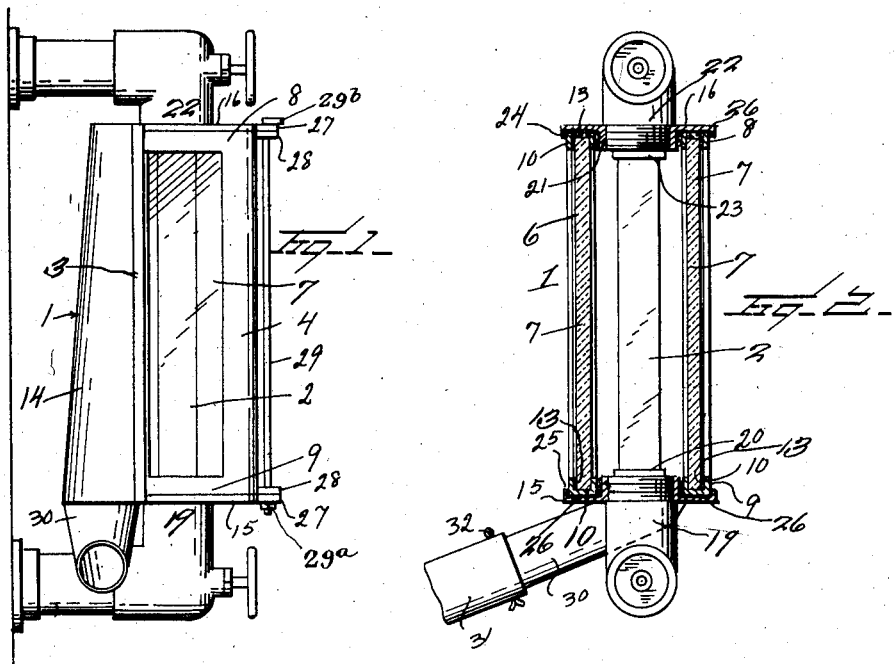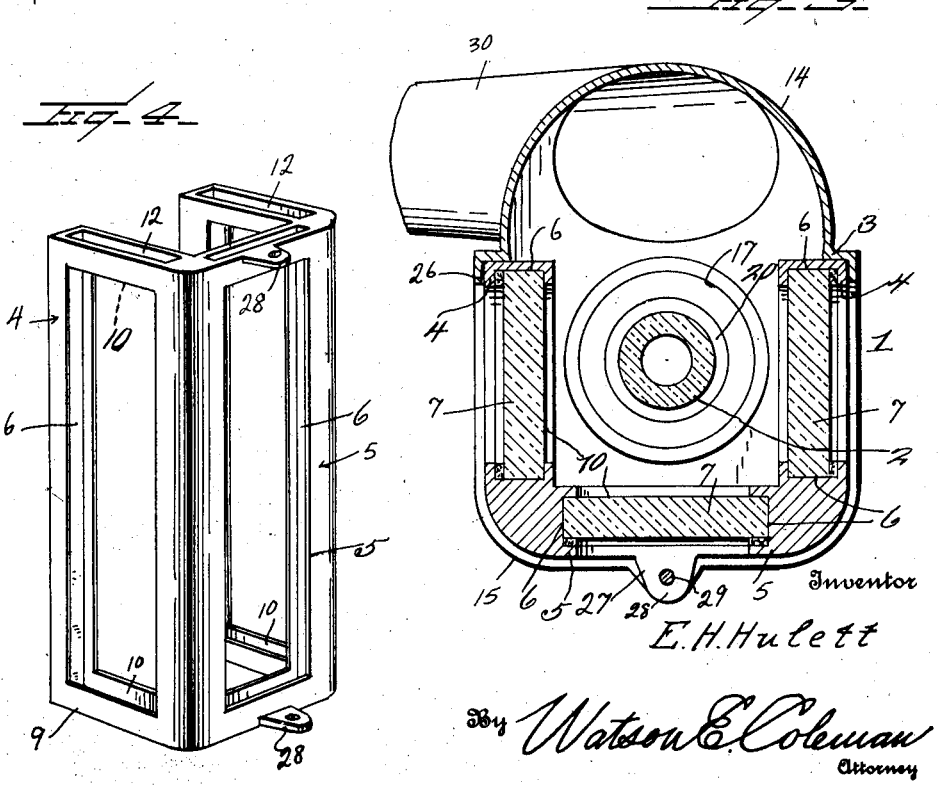

ELZIE HENRY HULETT, OF MICHIGAN CITY, INDIANA.

WATER-GLASS.

1,339,561.  Specification of Letters Patent.  Patented May 11, 1920.

Application filed June 21, 1919. Serial No. 305,785.

*To all whom it may concern:*

Be it known that I, ELZIE H. HULETT, a citizen of the United States, residing at Michigan City, in the county of Laporte and State of Indiana, have invented certain new and useful Improvements in Water-Glass, of which the following is a specification, reference being had to the accompanying drawings.

This invention relates to a water glass and particularly to an improved water guard, and the invention aims to provide a device of this kind including means for carrying out the escaping steam and water, in case the water tube should break.

The invention further aims to provide an improved combined water glass and guard consisting of two frames, one being clamped to the other, one being skeleton in form and provided with guides for the reception of heavy glass panels, in order to house the water tube, the other being in the form of a hood or guard having a connection with a pipe, tube or the like for carrying off the escaping steam and water should the water tube break.

Heretofore it has been found that in case water tubes break, the escaping steam and water will flow at random in the cab of the locomotive and no doubt cause considerable damage, hence the provision of means for carrying off the escaping steam and water, which, should the water tube break, may be carried to any suitable location.

The invention further aims to provide means for permitting the heavy glass panels of the skeleton frame to be inserted, there being suitable material, such as plaster Paris or the like employed, to insure tight joints of the glass panels.

The invention further aims to provide means for securing two sections or parts of the combined water glass and guard together.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:

Figure 1 is a view showing the application of the improved combined water glass and guard, showing the same constructed in accordance with the invention.

Fig. 2 is a vertical sectional view through the same, particularly through the guard and the water glass frame proper, thereby showing the water tube, the water glass, the guard, and the means connected to the guard, for carrying off the escaping steam and water should the water tube break.

Fig. 3 is a horizontal sectional view, clearly showing the guard and the water glass frame, showing the glass panels in cross-section, illustrating the water tube housed by the water glass.

Fig. 4 is a detail perspective view of the water glass frame.

Referring to the drawings, 1 designates the combined water glass and guard as a whole, and which comprises the water glass proper 2, and the guard frame 3. The water glass frame proper is rectangular, comprising side and front portions 4 and 5. The side and front portions are in the form of channel irons, the channels 6 of which receive the side and front heavy panels of glass 7, there being plaster Paris or other suitable material in the channels to hold the glass panels securely in place. The upper and lower ends 8 and 9 are rectangular and are provided with channels 10, for the reception of the end edges of the glass panels. The upper end of the water glass frame proper is provided with slots 12, through which the glass panels may be inserted, in order that they may engage the channels. Plaster Paris or other suitable material, as indicated at 13 also secures the ends of the glass panels in the channels of the opposite end pieces of the water glass frame proper. The guard frame comprises the arched hood portion 14, and the end pieces 15 and 16. The bottom end piece 15 is provided with a flanged opening 17, for the reception of the lower end of the water tube 2 and the adjoining end of a pipe connection 19 from the boiler. Where the water tube and the pipe connection with the boiler adjoin each other, the suitable packed joint 20 is provided, to avoid leakage. The upper end piece 16 also has a flanged opening 21, in which the adjoining ends of the water tube and a pipe connection 22 from the boiler are connected, by means of a packed joint 23. The end pieces 15 and 16 are provided with shallow channels, for the reception of the upper and lower ends of the water glass frame proper. These shallow channels 24 and 25 also receive suitable material, such as plaster Paris or the like, in order to secure the end pieces 15 and 16 to the water glass frame proper. The opposite longitudinal parts of the arched hood overlie the longitudinal side portions of the water glass frame proper, and are provided with suitable packed joints with the water glass frame. Such packed joints 26 may consist of any suitable packing, such as white lead, plaster Paris or the like. The shallow channels of the end pieces 15 and 16 may receive packing other than plaster Paris, say for instance white lead or the like, or white lead and a wood fiber. If found necessary, wool fiber may be used in the other joints where white lead or plaster Paris are employed. The end pieces 15 and 16 are provided with projecting apertured lugs 27, which register with apertured lugs 28 on the forward portions of the upper and lower ends of the water glass frame proper, there being a rod 29 passing through the apertures of the lug, and having suitable means such as a nut or the like 29$^a$ on one end and a head 29$^b$ on its other end for holding the rod in place, and for clamping the end parts 15 and 16 of the guard frame proper securely to the opposite ends of the water glass frame proper. The lower end piece of the guard frame is provided with a tapering tubular extension 30, to which a pipe or tube 31 is connected by a cotter key or the like 32, for carrying off the escaping steam and water, in case the water tube becomes broken. This pipe or tube 31 may terminate at any suitable location, in order to convey the escaping steam and water into some suitable receptacle, or may terminate at a point under the locomotive, so that the steam and water may be conveyed to the road bed.

The invention having been set forth, what is claimed as new and useful is:

1. In a combined water glass and guard, the combination with a water glass frame proper having vertical channels in its adjacent faces and having their lower ends closed, and their upper ends open, of glass panels secured in said channels, a guard frame comprising a hood and end pieces forming parts of the hood, said end pieces over-lying the water glass frame proper and having channels conforming to and receiving the upper and lower ends of the water glass frame proper and having water tight connections therewith, a water tube housed in the water glass, means adapted to be carried by a boiler and being threaded into the end pieces and connected to the water tube, said hood being in communication with the interior of the water glass and having means at its lower end to carry off the steam and water should the water tube break, said end pieces and the water glass frame proper having adjacent ears, and a single headed rod passing through the ears and having means on the unheaded end to hold the rod in place thereby holding the channels of the end pieces in engagement with the water glass frame proper.

2. The combination with a water glass frame proper having vertical channels having certain of their ends open, of glass panels secured in and having water tight connections with the channels, a guard frame including a hood and end pieces forming integral parts with the hood, said end pieces extending laterally of the hood and in parallel planes and over-lying the water glass frame proper, the adjacent faces of the end pieces having channels conforming to, receiving and having liquid tight connections with the opposite ends of the water glass frame proper, one of said end pieces acting to close the open ends of said vertical channels, both of said end pieces having central flanged openings, water gaged glass elbows carried by the boiler and having threaded connections with said flanged openings of the end pieces, said hood having opposite vertical parallel shoulders engaging the water glass frame proper to coöperate with the channels of the end pieces to reinforce the structure, the lower end of the hood having outlet means, a water tube housed in said water glass frame proper and connecting said elbows, said end pieces and the water glass frame proper having adjacent ears, and a single rod passing through said ears and having a head at one end, and means at its other end for holding the rod in place and holding the hood, the end pieces and the water glass frame relatively rigid.

In testimony whereof I hereunto affix my signature in the presence of two witnesses.

ELZIE HENRY HULETT.

Witnesses:
J. J. WATSON,
GEO. A. PROCTER.